3,552,996
METHOD OF COATING 4-METHYL PENTENE-1 POLYMERS

Michael Cass, Bedford, England, assignor to Imperial Chemical Industries Limited, London, England, a corporation of Great Britain
No Drawing. Filed Dec. 18, 1967, Ser. No. 691,169
Claims priority, application Great Britain, Jan. 6, 1967, 974/67
Int. Cl. B32b 27/32; B44d 1/14
U.S. Cl. 117—71                    8 Claims

ABSTRACT OF THE DISCLOSURE

The surface of a 4-methyl pentene-1 polymer is contacted with a coating solution of a coating medium in carbon tetrachloride or chloroform. The contacting may be effected at ambient temperature, particularly when using carbon tetrachloride. The coating solution may be used as a primer, a further coating being applied to the surface after treating with the primer. The coating solution can contain 10 to 50% by volume of the coating medium. Using a primer containing a thermosetting resin, the resin is only partially cured before applying the further coating.

---

The present invention relates to the treatment of surfaces of polymers of 4-methyl pentene-1.

Polymers of 4-methyl pentene-1 have recently become of interest commercially on account of their high melting point (243° C.), low density (0.86) and the fact that by suitable treatment they may be obtained in a highly transparent form. However, like other polyolefines, polymers of 4-methyl pentene-1 have a high degree of chemical inertness and this makes it difficult to stick the polymer to other materials and to apply an adherent coating to the polymer.

It is known to treat the surface of polyolefines to improve adhesion thereto. The known methods include oxidising the surface using chemical reagents such as hot chromic acid solution or hot acidified potassium permanganate solution; subjecting the surface to an electric discharge or ionising radiation; or flame treating the surface of the polymer. Flame treatment, although satisfactory for treatment of polyethylene and polypropylene has been found to be unsatisfactory with polymers of 4-methyl pentene-1. Electric discharge has also proved to be far from satisfactory and furthermore both flame treatment and electric discharge are inconvenient for use in treating irregular shaped mouldings, such as, for example, bottles. Chemical treatment of the surface may be used for irregular mouldings, but such treatment may involve the use of hazardous chemicals, e.g. hot chromic acid, or may result in staining of the polymer.

It is an object of the present invention to provide an improved method for applying a coating medium to the surface of a polymer of 4-methyl pentene-1.

According to the present invention there is provided a method for applying a coating medium to a surface of a 4-methyl pentene-1 polymer, such method comprising contacting the polymer surface with a solution of the coating medium in chloroform or carbon tetrachloride.

It should be appreciated that reference herein to polymers of 4-methyl pentene-1 or 4-methyl pentene-1 polymers includes not only homopolymers but also copolymers with one or more other monomers, suitable polymers including those disclosed in British Pats. 942,297; 968,935; 1,001,801; 1,014,886; and 1,085,914.

It has been found that the method of the present invention may be used for coating 4-methyl pentene-1 polymers at ambient temperature, for example 15 to 30° C., particularly good results being obtained when carbon tetrachloride is used as the solvent.

It has been found that some coating media may be applied directly to an untreated 4-methyl pentene-1 polymer surface using carbon tetrachloride or chloroform as a solvent in accordance with the present invention. For other coatings, however, the surface should be pretreated using a primer solution comprising carbon tetrachloride or chloroform having dissolved therein a suitable coating medium.

Materials which may be applied directly to the polymer by the method of the present invention include certain paints, inks and lacquers. If a pretreated surface is required, the primer solution is conveniently a solution of a lacquer in, for example, carbon tetrachloride. A wide range of lacquers may be used for the primer solution including lacquers based on thermoplastic resins such as polybutyl methacrylate in a xylol/butanol solvent and lacquers based on thermosetting resins such as urea/formaldehyde resins, phenol/formaldehyde resins, melamine/formaldehyde resins or resins comprising a mixture of a monoaldehyde with an interpolymer of acrylamide with at least one other monoethylenically unsaturated monomer. Although thermoplastic materials are suitable for use in the primer solution, they will soften if the coated polymer is subsequently subjected to an elevated temperature and thus it is preferred to use a thermosetting resin which may be cured by a suitable heat treatment once it has been applied to the surface. If a subsequent coating is to be applied, however, it is preferred that the primer coating is only partially cured since is has been found that better adhesion is obtained when the primer coating is only partially cured.

The use of a primer treatment in accordance with the present invention allows polymers of 4-methyl pentene-1 to be vacuum metallised, bonded with an adhesive or encapsulated in an insulating varnish for use in electrical components.

The carbon tetrachloride or chloroform may be mixed with the coating medium in a wide range of ratios, for example, from 50 to 50 parts by volume, up to 90 to 10 parts by volume. Satisfactory results have been obtained with primer compositions comprising a 20% by volume solution of a urea/formaldehyde based lacquer in carbon tetrachloride. It will, however, be appreciated that the most suitable ratio for mixing the carbon tetrachloride or chloroform and the coating medium will depend on the coating medium, which in general will comprise a resin in a suitable solvent, and could be expected to increase as the solids content of the coating medium increased. It will also be appreciated that the coating medium must be fully compatible with large volumes of carbon tetrachloride or chloroform.

The solution is conveniently applied to the 4-methyl pentene-1 polymer by dipping the polymer into the solution of carbon tetrachloride or chloroform and coating medium. The polymer is contacted with the solution for a suitable length of time, for example, at least ½ minute at ambient temperature using carbon tetrachloride as solvent. If contacting is effected at an elevated temperature, the contact time may be reduced.

The method of the present invention may be applied to the treatment of surfaces of shaped articles formed by polymers of 4-methyl pentene-1.

The invention will now be illustrated in the following examples. In the examples the adhesion of the coating was determined using the "adhesive tape" test. This test involves sticking a strip of adhesive tape onto the coated sheet and then ripping it off sharply and noting the amount of coating removed with the adhesive tape.

EXAMPLE 1

A primer solution was prepared by diluting a urea/formaldehyde based lacquer with carbon tetrachloride to give a solution containing 80% by volume of carbon tetrachloride. The lacquer comprised 50% by volume of a mixture of an acid catalyzed urea/formaldehyde resin and blown castor oil in the ratio 2.5:1 by volume in a solvent consisting of a mixture of xylol and butanol in a 2:1 by volume ratio.

A sample of poly 4-methyl pentene-1 homopolymer in the form of a thick moulded sheet was immersed in the primer solution at ambient temperature (about 20° C.) for a time of 30 seconds.

The sheet was then removed from the solution and allowed to dry in air for 5 minutes.

The dried sheet was heated at 136° C. for 5 minutes to partially cure the primer coating. The coated sheet was subsequently encapsulated in an insulating varnish. The varnish was applied by immersing the primed sheet in the varnish for about 5 seconds at room temperature, allowing to dry in air for 10 minutes and then curing by heating at 136° C. for 5 hours. The varnish used was an alkaline catalysed phenol/formaldehyde resol resin in white spirit/xylene solvent.

The varnish adhered to the primed sheet to give an even coating which showed no sign of flaking.

Attempts to apply the varnish directly to a sheet of unprimed poly 4-methyl pentene-1 were unsuccessful; the varnish did not adhere to the polymer and runs off almost completely.

EXAMPLE 2

Sheets of poly 4-methyl pentene-1 were dipped in a primer solution as in Example 1. The dipped sheets were allowed to dry in air for 15 minutes. The dried sheet was then heated for 10 minutes at 130° C.

A base coat could then be applied to the primed sheet either by spraying or dipping.

Thus, a base coat sold by the Red Spot Paint & Varnish Co., under the designation SM 1225 was sprayed onto the primed sheet, dried in air for 15 minutes and cured by heating at 130° C. for 45 minutes.

A further primed sheet was sprayed with a base coat sold by the Bee Chemical Co. (U.K.) Ltd. under the designation ET 214 (a nitrocellulose lacquer), dried in air for 15 minutes and heated at 60° C. for 30 minutes.

The primed and coated sheets were then vacuum-metallised by placing them in a vacuum chamber which was evacuated to a pressure of below $5 \times 10^{-4}$ mms., and a coating of aluminum was evaporated onto the sheets using a tungsten filament heating element. A firm adherent coating of aluminium was obtained.

EXAMPLE 3

A sheet of 4-methyl pentene-1 polymer was dipped for 2 seconds at 60° C. into a 30% by volume solution of an acrylic lacquer in carbon tetrachloride. The lacquer was 20% by volume of polybutyl methacrylate in a solvent consisting of xylol and butanol in a 2:1 by volume ratio.

The dipped sheet was allowed to dry in air for 15 minutes and then heated to 80° C. for 20 minutes. The primed sheet was then metallised directly using the same procedure as in Example 2. An adherent coating of aluminium was obtained.

EXAMPLE 4

Sheets of 4-methyl pentene-1 polymer were dipped in a urea/formaldehyde primer solution and dried as in Example 1. The primer coating was then cured by heating for 30 minutes at 130° C.

It was then possible to print on the primed sheet using any of the known printing processes such as off-set letterpress or silk-screen printing. The print adhered firmly to the primed sheet.

EXAMPLE 5

A series of experiments were carried out to show the effect of concentration of the primer solution.

The coating medium was the urea/formaldehyde lacquer of Example 1. A 50% by volume solution of the lacquer in carbon tetrachloride gave no adhesion of the lacquer onto the polymer surface even after prolonged dipping at ambient temperature. A 25% by volume solution gave better results than the 50% solution, but the adhesion was still only moderate. A 15% solution was tried and found to give satisfactory coating adhesion, but the coating surface was streaky and possessed areas of matt and gloss surface. It was found that the thus coated surface did not readily accept a further coating and that adhesion of the further coating was poor.

Using a 20% solution, however, (as in Examples 1, 2, and 4) a smooth and glossy surface coating was obtained which provided adequate adhesion for subsequent coatings to the poly 4-methyl pentene-1 sheet.

EXAMPLE 6

A primer solution was produced by mixing the urea/formaldehyde lacquer of Example 1 with chloroform to give a 20% solution of the lacquer in chloroform.

A sheet of poly 4-methyl pentene-1 was then immersed in the primer solution for 2 minutes at ambient temperature.

This treatment produced a satisfactory primer coating on the polymer sheet, which could then be encapsulated, metallised or printed as set out in the previous examples.

EXAMPLE 7

The procedure of Example 2 was repeated except that the primed sheet was heated at 130° C. for 30 minutes, which was sufficient to completely cure the primer. It was found that the adhesion of the base coat and the metallised layer was not as good in this case as it was in Example 2 in which the primer was heated at 130° C. for only 10 minutes and thereby only partially cured.

EXAMPLE 8

The lacquer of Example 3 was used as the coating medium and this was mixed with a chlorinated hydrocarbon to give a 20% solution of the lacquer in the chlorinated hydrocarbon. Sheets of 4-methyl penetene-1 polymer, sold by Imperial Chemical Industries Limited as "TPX" methyl pentene polymer, were immersed in the lacquer solution for two minutes at 23° C. The plaques were then air dried for 15 minutes and heated for 30 minutes at 127° C. The results obtained using various chlorinated hydrocarbons are set out in the following table:

| Solvent: | Adhesion |
|---|---|
| Carbon tetrachloride | Good |
| Chloroform | Slight |
| Perchloroethylene | Poor |
| Ethylene dichloride | Poor |
| Chlorobenzene | Poor |
| Methylene chloride | Poor |
| Tetrachloroethylene | Poor |

These experiments indicate that only carbon tetrachloride and chloroform, give any adhesion of the base coating at ambient temperature.

EXAMPLE 9

The procedure of Example 8 was repeated using sheets of low density polyethylene or polypropylene. Poor adhesion was obtained with all solvents, including carbon tetrachloride and chloroform, on sheets of both polymers.

I claim:
1. A method for applying a coating medium which is a paint, ink or lacquer to a surface of a 4-methyl pentene-1 polymer comprising contacting the surface with a coating solution of the coating medium in carbon tetra- chloride or chloroform wherein said coating solution contains from 10% up to 50% by volume of the coating medium and drying the coated surface.

2. The method of claim 1 wherein the surface is contacted with the coating solution at ambient temperature.

3. The method of claim 1 wherein a further coating of a different coating material is applied to the dry coated surface.

4. The method of claim 1 wherein the coating solution contains a coating medium based on a thermosetting resin, and after drying, the dried surface is heated to partially cure the thermosetting resin and a further coating of a different coating material is applied to the partially cured coated surface.

5. The method of claim 1 wherein the coated surface is metallized.

6. The method of claim 1 wherein the coating medium is based on a thermosetting resin and after drying the coated surface it is heated to an elevated temperature to at least partially cure the thermosetting resin.

7. The method of claim 6 wherein the coating medium is a lacquer based on a thermosetting resin.

8. The method of claim 6 wherein the coating solution is a 20% by volume solution of a urea/formaldehyde based lacquer in carbon tetrachloride.

References Cited

UNITED STATES PATENTS

| | | | |
|---|---|---|---|
| 3,201,271 | 8/1965 | Simmons et al. | 117—71X |
| 3,112,199 | 11/1963 | Camerini et al. | 117—138.8(E)X |
| 3,143,422 | 8/1964 | Caldwell | 117—76(F)X |
| 3,196,123 | 7/1965 | Wheelock | 117—138.8(E)X |
| 3,201,302 | 8/1965 | Williams et al. | 117—138.8(E)X |
| 3,216,825 | 11/1965 | Caldwell | 117—138.8(E)X |
| 3,236,675 | 2/1966 | Hermitte et al. | 117—138.8(E)X |

WILLIAM D. MARTIN, Primary Examiner

R. HUSACK, Assistant Examiner

U.S. Cl. X.R.

117—15, 47, 72, 76, 107, 138.8, 161